United States Patent
Graston et al.

[19]

[11] Patent Number: 6,145,215
[45] Date of Patent: Nov. 14, 2000

[54] CONTAINER SPACE INDICATING TAPE AND METHOD

[76] Inventors: James A. Graston, 6405 8th St., SW. #3; Timothy A. Graston, 10507 Gravelly Lake SW., Suite 15A #262, both of Tacoma, Wash. 98499

[21] Appl. No.: 09/100,646

[22] Filed: Jun. 19, 1998

[51] Int. Cl.[7] .................................................. G01B 3/10
[52] U.S. Cl. .............................. 33/759; 33/679.1; 33/758
[58] Field of Search .................................. 33/15 B, 494, 33/679.1, 755, 758, 759, 760, 771; 283/79, 81, 100, 101, 136

[56] References Cited

U.S. PATENT DOCUMENTS

| | | | |
|---|---|---|---|
| 2,716,286 | 8/1955 | Penna ........................................... | 33/755 |
| 2,948,064 | 8/1960 | Wentsel ....................................... | 33/494 |
| 4,149,320 | 4/1979 | Troyer et al. ............................... | 33/758 |
| 4,696,110 | 9/1987 | Walker et al. ............................... | 33/494 |
| 4,811,489 | 3/1989 | Walker ........................................ | 33/759 |
| 4,823,469 | 4/1989 | Broselow .................................... | 33/760 |
| 4,965,943 | 10/1990 | Adams ....................................... | 33/759 |
| 5,012,590 | 5/1991 | Wagner et al. ............................. | 33/759 |
| 5,335,421 | 8/1994 | Jones, Jr. .................................... | 33/759 |
| 5,803,502 | 9/1998 | Noll et al. ................................... | 33/758 |

*Primary Examiner*—G. Bradley Bennett
*Attorney, Agent, or Firm*—Dean A. Craine

[57] ABSTRACT

A container space indicating tape comprising an elongated substrate with an outer surface and an inner surface designed to be longitudinally aligned and attached to the sidewall in a trailer or cargo container. Printed in the outer surface of the substrate are forward and rearward measurement indicators which inform a viewer of the distance and/or the amount of space occupied or available in the trailer or cargo container at a particular reference point or location therein. In the embodiments described herein, the measurement indicators include either English or Metric distance and volume units or the number of pallets. A method of loading cargo using the above tape is also provided.

13 Claims, 6 Drawing Sheets

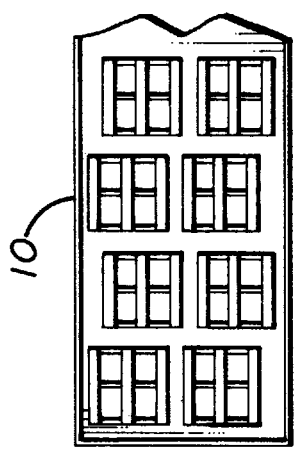
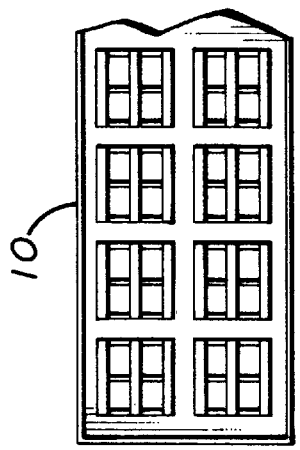
FIG. 5
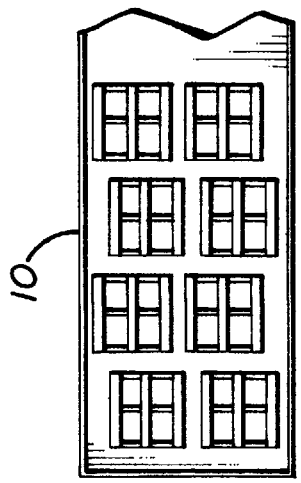

CONTAINER SPACE INDICATING TAPE AND METHOD

BACKGROUND OF THE INVENTION

1. Field of the Invention

This invention relates to an apparatus used to aid individuals to measure distances and volumes and, more particularly, to such an apparatus used to measure the distances and volumes in a transport trailer or cargo container.

2. Description of the Related Art

Transport truck operators often haul cargo varying distances on enclosed trailers or cargo containers. Generally, it is more cost-efficient to fully load the trailer or cargo container with cargo.

In most regions in the U.S., it is common for a truck operator to transport cargo for different companies. On any particular trip, the trailer or cargo container, hereinafter referred to as trailer, may contain cargo picked up from several locations and intended to be delivered to different destinations. Most companies find it desirable to transport all of their cargo in one trailer rather than splitting it up into smaller batches and transporting multiple trailers to reduce breakage or shrinkage. Transporting all of the cargo in one trailer makes the loading and unloading process more cost-efficient.

Most highways in the U.S. have weight restrictions on trucks which force truck operators to be cognizant of the total weight of their cargo. One common method used by truck operators to determine the total weight of the cargo inside the trailer is to determine the weight of a given unit of cargo, place a specific number of units of cargo on a pallet, and then load a specific number of pallets onto the truck. By multiplying weight per given unit of cargo by the number of units per pallet by the total number of pallets loaded onto the truck, the approximate total weight of the cargo loaded onto the truck can be easily determined.

When a trailer is partially filled with cargo, the operator must accurately determine the amount of cargo that can be added to the trailer. In order to make this determination, the amount of used or available space and the amount of cargo weight available in the trailer must be known. What is needed is an apparatus to aid a truck operator or shipper to quickly and precisely determine the amount of space or cargo weight used or available in a trailer.

SUMMARY OF THE INVENTION

It is an object of the present invention to provide an apparatus to aid an operator or shipper to quickly and accurately determine the amount of space or cargo weight used or available on a trailer.

It is another object of the invention to provide such an apparatus which assists an operator in a manner commonly used in the shipping industry.

It is a further object of the invention to provide such an apparatus which is adaptable for different types of cargo.

It is a still further object of the invention to provide such an apparatus that is inexpensive to manufacture and can be easily retro-fitted into existing trailers.

These and other objects are met by the herein disclosed container space indicating tape comprising an elongated substrate with an outer surface and an inner surface. Applied to the inner surface of the substrate is an attachment means, such as an adhesive, which enables the substrate to be easily attached to the sidewall on a trailer, cargo container, or other suitable shipping vessel.

Printed on the outer surface of the substrate are forward and rearward visual measurement indicators which inform a viewer of the distances or the amount of empty or occupied space in the trailer, cargo container, or shipping vessel from any particular location therein. In the embodiments described herein, the forward and rearward measurement indicators may be color coded and include either English or Metric distance units, volume units, or the number of standard size pallets.

BRIEF DESCRIPTION OF THE DRAWINGS

FIG. 5 is a top plan view of a trailer showing both types of pallets loaded on a trailer.

DESCRIPTION OF THE PREFERRED EMBODIMENT(S)

Shown in the accompanying FIGS. 1–5, there is shown a container space indicating tape, generally referred to as 20 designed to be attached to the inside surface 14 of the sidewall 12 of a trailer 10. The purpose of the tape 20 is to aid a viewer in quickly and accurately determining the distance from forward or rearward reference points, or the amount of space used or available in the trailer 10.

Figure 1:
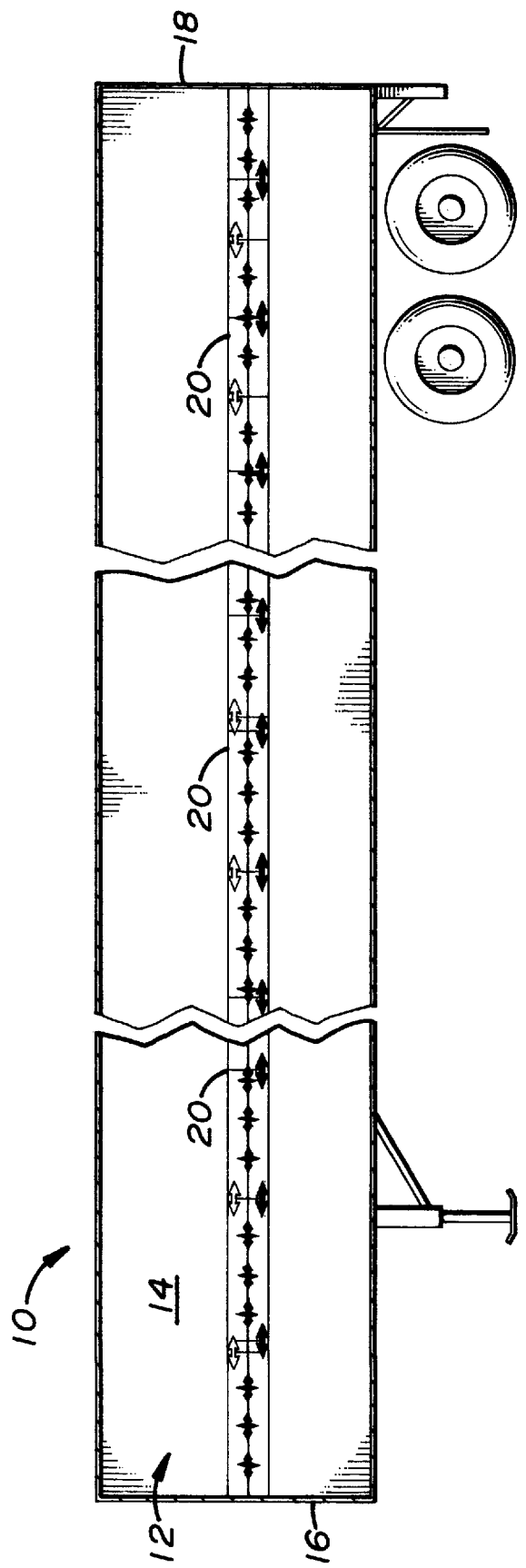
FIG. 1 is a side elevational view of the inside surface of a trailer with the container space indicating tape attached thereto.
Figure 2:
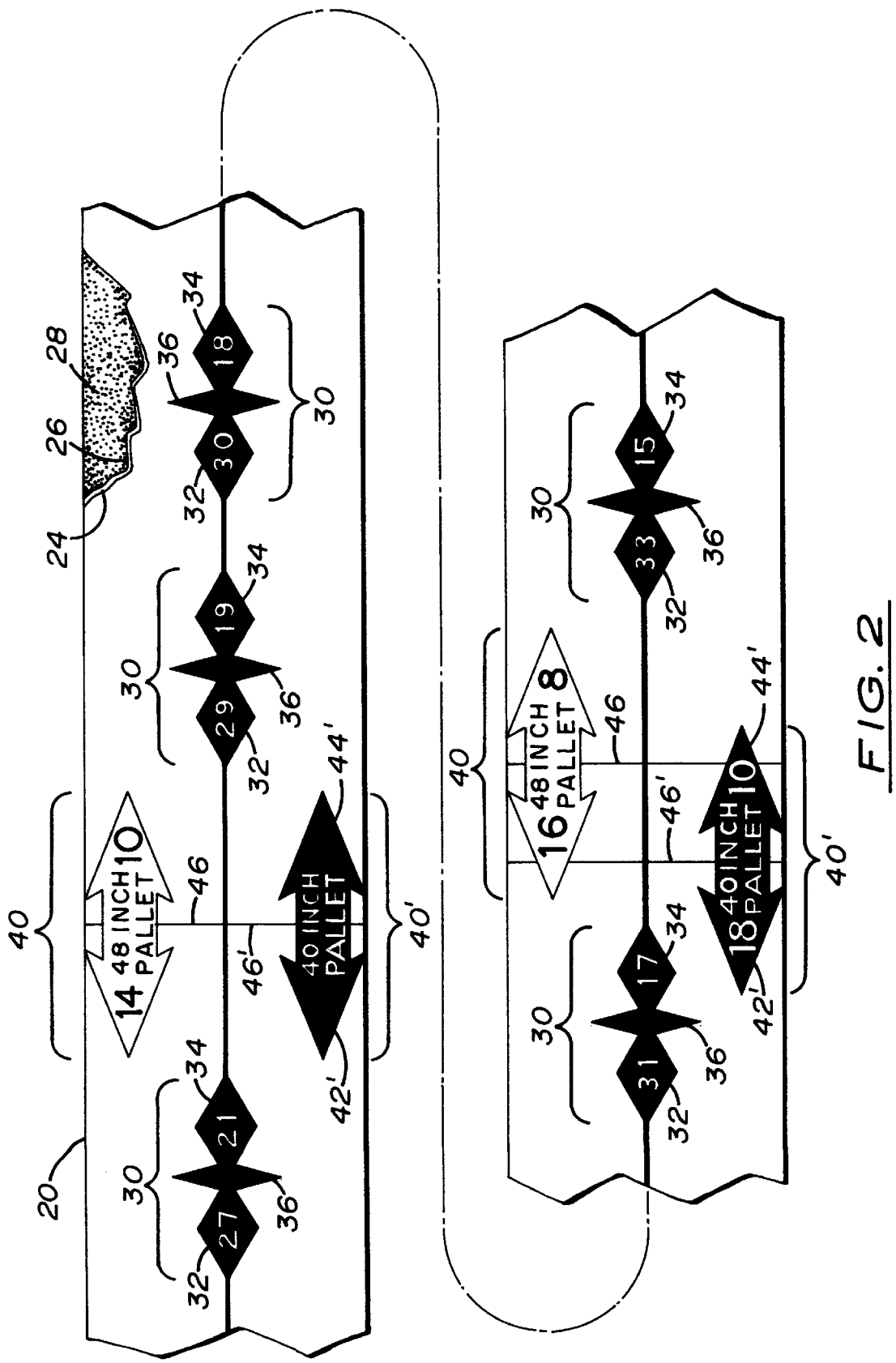
FIG. 2 is a side elevational view of a section of indicating tape with feet indicators and three different volume indicators.

As shown in FIG. 2, the tape 20 comprises an elongated substrate 22 with an outer surface 24 and an inner surface 26. Applied to or incorporated into the inner surface 26 is an adhesive 28 which enables the substrate 22 to be easily and securely attached to the inside surface 14. Printed on the outer surface 24 of the substrate 22 are forward and rearward measurement indicators 30. The forward and rearward measurement indicators 30 include in combination a forward distance indicator 32, a rearward distance indicator 34, and a marking indicator 36. The forward distance indicator 32 indicates the distance from the marking indicator 36 to the front edge 21 of the substrate 22. When the front edge 21 is placed immediately adjacent to the front wall 16, the forward distance indicator 32 indicates the total distance from the marking point indicator 36 to the front wall 16. The rearward distance indicator 34 indicates the distance from the marking point indicator 36 to the rear edge 23 of the substrate 22. When the total length of the substrate 20 is equal to the total length of the side wall 12, the rearward distance indicator 34 indicates the distance from the marking point 36 to the back doors or rear wall of the trailer 10.

Figure 3:
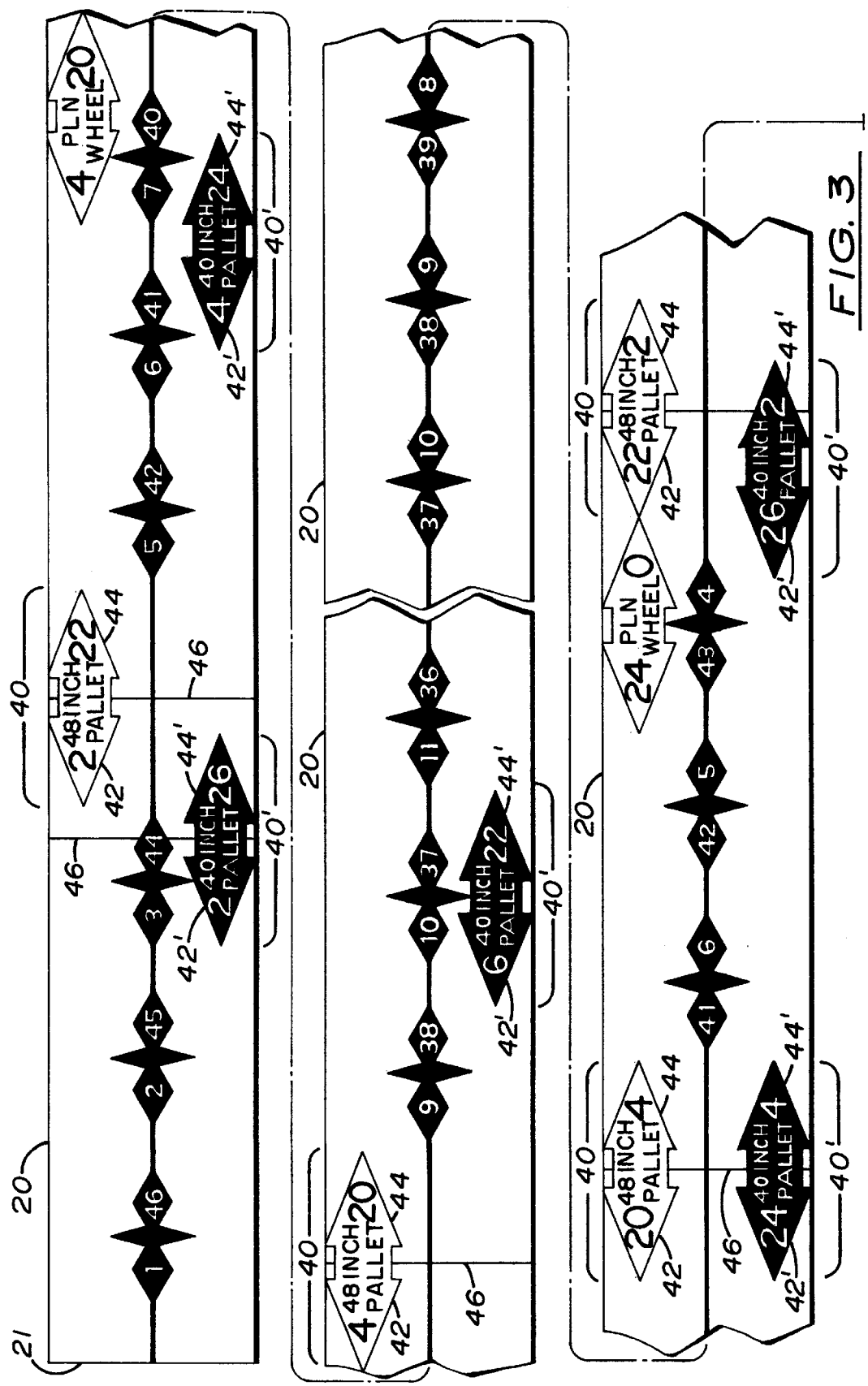
FIG. 3 is a side elevational view of a section of indicating tape with pallet and feet indicators.
Figure 3:
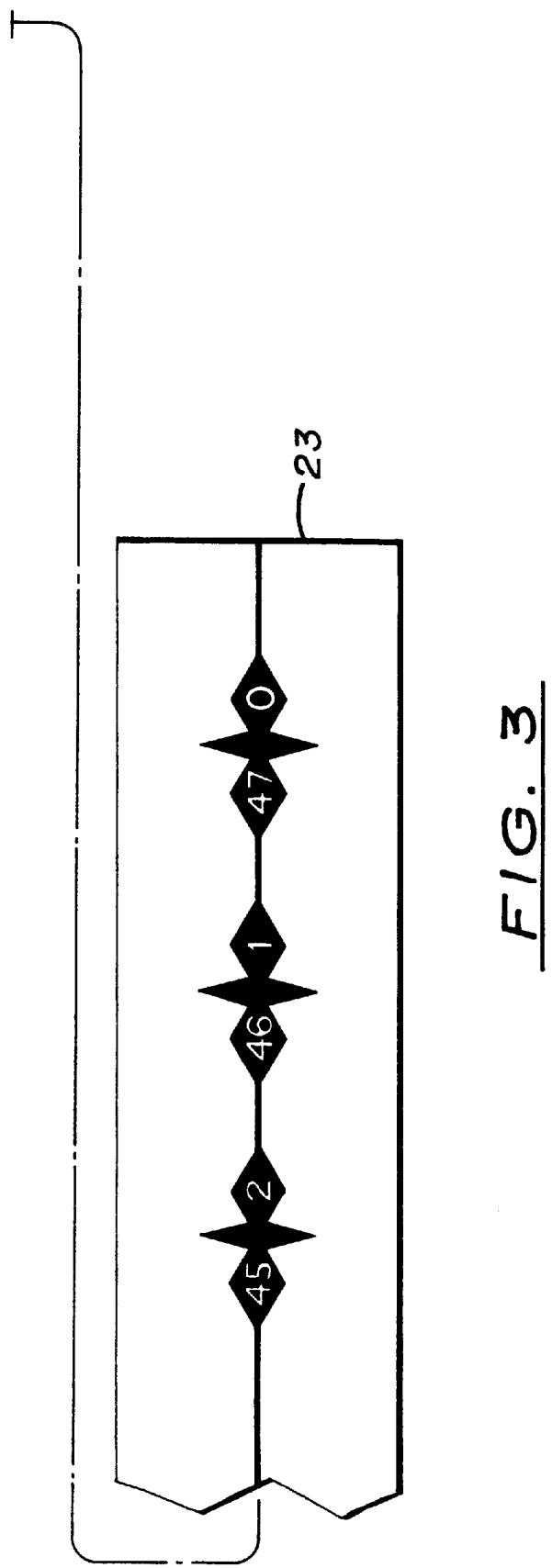
Figure 4:
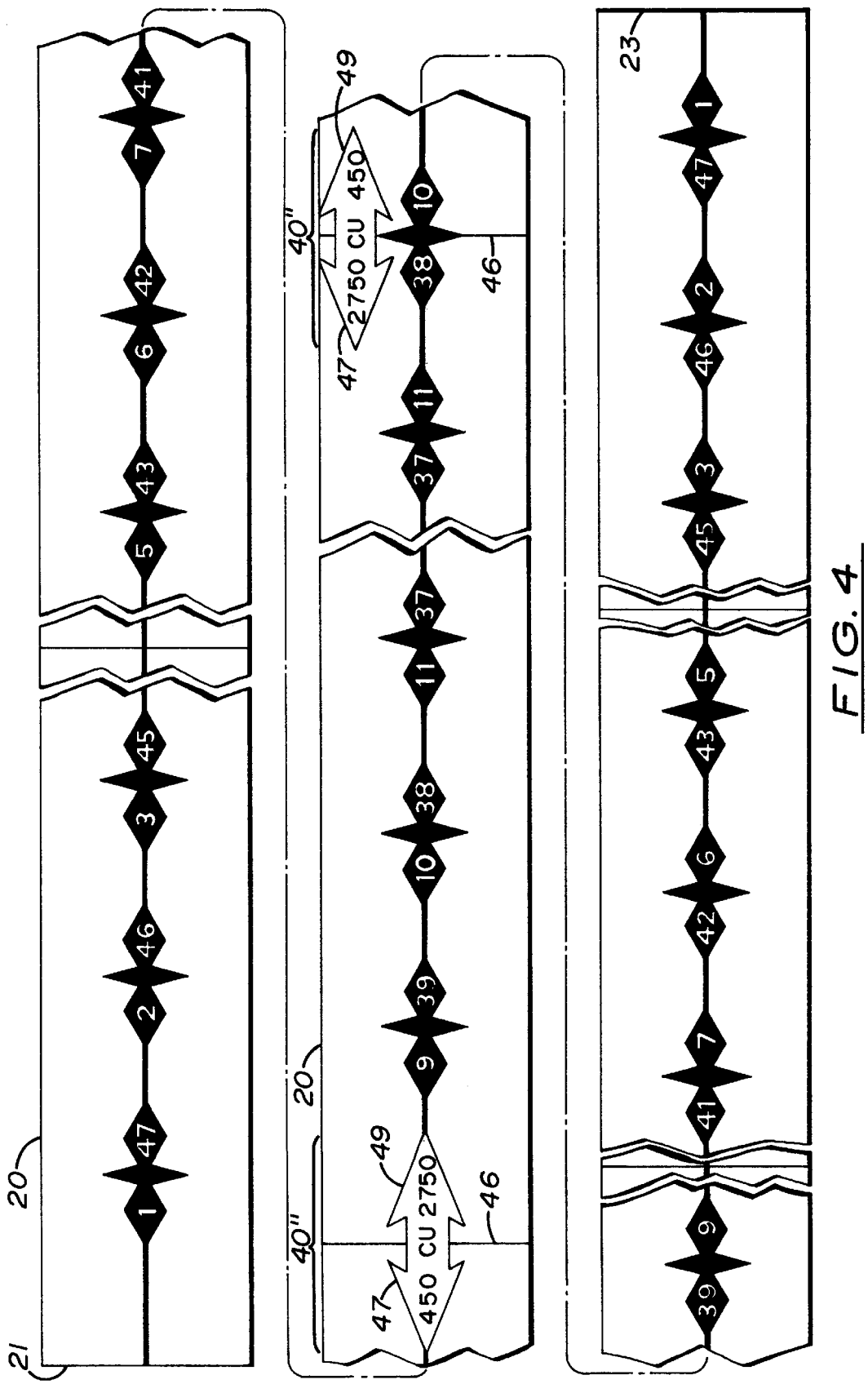
FIG. 4 is a side elevational view of a section of indicating tape with cube and feet indicators.

As shown in FIG. 3, another embodiment of the forward and rearward indicators are shown printed on the outer surface 24 of the substrate 20. There are two standard pallet sizes used in the shipping industry—a (48×40) inch pallet, and a (40×40) inch pallet. In a trailer, both pallets can be used individually or in combination. In addition, both pallets can be aligned transversely and longitudinally or aligned in an off-set manner, called a pin wheel, in the trailer. There are three types of forward and rearward measurement indicators 40 to be used with the two types of pallets when the pallets are aligned in a pin wheel manner. In the first embodiment, the forward and rearward volume/space indicator 40 is used to indicate (48×40) inch pallets while forward and rearward volume/space indicator 40' is used with (40×40) inch pallets. Both indicators 40 and 40' include a forward pallet indicator 42, 42', respectively, which indicate the number of pallets that can be loaded between the marking point indicator 46 to the front edge 21 of the substrate 22. Both indicators 40 and 40' also include a rearward pallet indicator 44, 44', respectively, which indicate the number of pallets that can be loaded on the trailer 10 between the marking point indicator 46 and the rear edge 23 of the substrate 22.

In addition to indicating the number of pallets that can be loaded on the trailer 10, the tape 20 may also include the forward and rearward volume/space indicators 40" that indicate the number of cubic feet, called "cubes" of cargo space used or available on the trailer. Forward and rearward volume/space indicators 40" include a marking indicator 46, a forward and rearward cube indicators 47 and 49, respectively, which indicate the number of cubic feet of cargo that can be loaded on the trailer between the marking indicator 46 and the front and rear edges 21, 23, respectively, of the substrate 22.

In the preferred embodiment, the indicators 40, 40', 40" are color-coded to improve visibility.

During assembly, the front edge 21 of the substrate 22 is attached to the front reference point on the side wall 12. The front reference point is normally located immediately adjacent to the front wall 16 of the trailer 10. The tape 20 is then aligned horizontally and longitudinally over the inside surface 14 of the side wall 12. The tape 20 must have a total length equal to the total inside length of the trailer 10 so that the rear edge 23 terminates at the back wall of the trailer. Typically, the inside length of a trailer 10 measures 47 ft., 6 inches.

Using the above tape 20, a method of loading cargo onto a trailer is provided. The method comprises the following steps:

a. selecting a container space indicating tape 20, said tape having forward and rearward visual measurement indicators printed thereon;
 b. determining a beginning reference point and an ending reference point on the trailer;
 c. longitudinally aligning and attaching said tape 20 to the side wall 12, so that said tape 20 begins at said beginning reference point and terminates at said ending reference point;
 d. visually examining the forward and rearward measurement indicators to determine the amount of space or space units used or available in the trailer 10;
 e. selecting a sufficient amount of cargo to be placed in said trailer in accordance with said forward and rearward measurement indicators; and,
 f. loading the cargo onto said trailer 10.

In compliance with the statute, the invention, described herein, has been described in language more or less specific as to structural features. It should be understood, however, the invention is not limited to the specific features shown, since the means and construction shown comprise only the preferred embodiments for putting the invention into effect. The invention is, therefore, claimed in any of its forms or modifications within the legitimate and valid scope of the amended claims, appropriately interpreted in accordance with the doctrine of equivalents.

We claim:

1. A container space indicator tape for a trailer, comprising:
 a. an elongated substrate having a front edge, a rear edge, an outer surface and an inner surface, said substrate being sufficient in length to longitudinally extend the entire length of a trailer;
 b. an attachment means attached to said inner surface of said substrate thereby enabling said substrate to be attached to a trailer;
 c. a plurality of forward measurement indicators spaced apart and printed on said outer surface of said substrate, each said forward measurement indicator including a marking indicator, a forward distance indicator indicating the distance from said marking indicator to said front edge of said substrate and a rearward distance indicator indicating the distance from the marking indicator to said rear edge of said substrate;
 d. a plurality of forward volume/space indicators printed on said outer surface of said substrate that indicates the amount of storage space from said marking indicator to said front edge of said substrate;
 e. a plurality of rearward volume/space indicators printed on said outer surface of said substrate that indicates the amount of storage space from said marking indicator to said rear edge of said substrate.

2. A container space indicating tape, as recited in claim 1, wherein each said forward volume/space indicator includes a forward pallet number and said rearward volume/space indicator includes a rearward pallet number.

3. A container space indicating tape, as recited in claim 2, wherein said forward pallet number indicates the number of pallets that can be loaded on a trailer between the front edge of said substrate and said marking indicator.

4. A container space indicating tape, as recited in claim 2, wherein said rearward pallet number indicates the number of pallets that can be loaded on a trailer between the rear edge of said substrate and said marking indicator.

5. A container space indicating tape, as recited in claim 1, wherein said forward volume/space indicator indicates the number of cubes from said marking indicator to said front edge of said substrate and said rearward volume/space indicator indicates the number of cubes from said marking indicator to said rear edge of said substrate.

6. A container space indicator tape for a trailer, comprising:
 a. an elongated substrate having an outer surface and an inner surface, said substrate being sufficient in length to longitudinally extend the entire length of a trailer;
 b. an attachment means attached to said inner surface of said substrate thereby enabling said substrate to be attached to a trailer;
 c. a forward pallet indicator printed on said outer surface of said substrate;
 d. a forward cube indicator on said outer surface of said substrate;
 e. a rearward pallet indicator printed on said outer surface of said substrate;
 f. a rearward cube indicator printed on said outer surface of said substrate.

7. A container space indicating tape, as recited in claim 6, wherein said forward and rearward pallet indicators are color coded.

8. A container space indicating tape, as recited in claim 6, further including rearward volume/space indicators printed on said outer surface of said substrate.

9. A container space indicating tape, as recited in claim 8, wherein said forward volume/space indicators indicate the number of pallets that can be loaded between said marking indicator and said front edge of said substrate when attached to a trailer.

10. A container space indicating tape, as recited in claim 8, wherein said rearward volume/space indicators indicate the number of pallets that can be loaded between marking indicator and said rear edge of said substrate when attached to a trailer.

11. A container space indicating tape, as recited in claim 8, wherein said forward volume/space indicators indicate the number of cubic feet of cargo that can be loaded on a trailer from said front edge point of said substrate when attached to a trailer.

12. A container space indicating tape, as recited in claim 8, wherein said rearward volume/space indicator indicate the number of cubic feet of cargo that can be loaded on a trailer from said rear edge of said substrate to said marking point while said substrate is attached to a trailer.

13. A method of loading cargo onto a trailer, comprising the following steps:

a. selecting a container space indicating tape, said tape having forward and rearward distance indicators and forward and rearward volume/space indicators printed thereon;

b. determining the front reference point and rear reference point on the trailer;

c. longitudinally aligning and attaching said tape to a side wall on the trailer so that said tape begins at said front reference point and terminates at said rear reference point of said trailer;

d. visually examining the forward and rearward distance and forward and rearward volume/space indicators to determine the distance or the amount of space available in the trailer;

e. selecting a sufficient amount of cargo to be placed in said trailer in accordance with said forward and rearward measurement indicators; and, f. loading the cargo onto said trailer.

* * * * *